US005987155A

United States Patent [19]
Dunn et al.

[11] Patent Number: 5,987,155
[45] Date of Patent: Nov. 16, 1999

[54] BIOMETRIC INPUT DEVICE WITH PERIPHERAL PORT

[75] Inventors: Christopher S. Dunn, Manotick; Stephen J. Borza, Ottawa; Gordon Freedman, Nepean, all of Canada

[73] Assignee: Dew Engineering and Development Limited, Ottawa, Canada

[21] Appl. No.: 08/958,699

[22] Filed: Oct. 27, 1997

[51] Int. Cl.[6] .................................................... G06K 9/00
[52] U.S. Cl. ........................... 382/116; 382/124; 235/382
[58] Field of Search ..................................... 382/115, 116, 382/124, 125; 356/71; 235/380, 382, 372, 381, 375; 340/825.34; 380/23; 902/2, 3, 4, 5

[56] References Cited

U.S. PATENT DOCUMENTS

| | | | |
|---|---|---|---|
| 3,581,282 | 5/1971 | Altman | 340/825.34 |
| 3,928,842 | 12/1975 | Green at al. | 382/124 |
| 4,993,068 | 2/1991 | Piosenka et al. | 380/23 |
| 4,995,086 | 2/1991 | Lilley et al. | 382/124 |
| 5,513,272 | 4/1996 | Bogosian, Jr. | 382/116 |
| 5,598,474 | 1/1997 | Johnson | 380/23 |
| 5,623,552 | 4/1997 | Lane | 382/124 |
| 5,753,899 | 5/1998 | Gomm et al. | 235/381 |
| 5,756,978 | 5/1998 | Soltesz et al. | 235/380 |
| 5,815,252 | 9/1998 | Price-francis | 356/71 |
| 5,825,005 | 10/1998 | Behnke | 235/380 |
| 5,838,812 | 11/1998 | Pare, Jr. et al. | 382/115 |

*Primary Examiner*—Joseph Mancuso
*Assistant Examiner*—Vikkram Bali
*Attorney, Agent, or Firm*—Neil Teitelbaum & Associates

[57] ABSTRACT

A transducer is provided with an integral smart card reader. For security applications the transducer is a biometric information input device. The device provides co-operative operation of the smart card and the transducer to provide user specific processing of biometric information provided by the user. Because of the integral smart card reader, tampering and monitoring of security operations is prevented.

18 Claims, 5 Drawing Sheets

BIOMETRIC INPUT DEVICE WITH PERIPHERAL PORT

FIELD OF THE INVENTION

This invention relates generally transducer systems and in a particular instance, to a biometric input device comprising a card slot for accepting a peripheral card.

BACKGROUND OF THE INVENTION

Computer security is fast becoming an important issue. With the proliferation of computers and computer networks into all aspects of business and daily life—financial, medical, education, government, and communications—the concern over secure file access and data communications is growing. One method of preventing unauthorized access to files is by using encryption and cipher techniques. These techniques convert data into other forms of data in a fashion that is reversible. Once encrypted, the data is unintelligible unless first decrypted. RSA, DES and CAST are known encryption techniques, which are currently believed to provide sufficient security for computer communications and files.

Each of these encryption techniques uses a cipher key. Such a key is crucial to the encryption/decryption process. Anyone with a correct key can access information that has previously been encrypted using that key. The entry of the key from the keyboard is impractical since such a key must be remembered by a user for entry and as such is liable to be discovered by an individual desiring access to existing encrypted files.

Further, there is great concern over communication of keys within commercial and governmental offices. It is common for users to inform others of their keys or to transfer their keys to others for use during holidays, sick days, or even as a reminder of the key should the user forget. Also, keys are often written down at the workstation in case a user should forget. Such written passwords undermine the security of many systems.

In DES encryption, the key is a numerical value, for example 56 bits in length. Such a key can be used to encrypt and subsequently to decrypt data. The security of the data once encrypted is sufficient that the key is required to access the data in an intelligible form. Thus the security of the data is related to the security of the key.

Some encryption systems use keys stored on the same device as the encrypted files. This is akin to storing a lock and its key in the same location. A knowledgeable user gaining access to the device could locate the key and access the data. Other encryption systems use keys stored on portable cards. Such a key is accessed via a password entered at the keyboard. Other users can take such a portable card and such a password can be discovered. The portable card is equally subject to transfer between employees and improper storage—at a user's desk.

In a fingerprint input transducer or sensor, the finger under investigation is usually pressed against a flat surface, such as a side of a glass plate, and the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Portable fingerprint devices are known in the art. One such device is disclosed in U.S. Pat. No. 5,467,403 and relates to a portable imaging device for capturing fingerprint images and transmitting them to a central location for verification. Such a device is useful in an information gathering and identification process comprising a large central database of fingerprint information. It does not, however, address the current concern for personal privacy with regards to the fingerprint data. Further, such a system can only act to verify identification and thus restrict access from a central location. This requires communications, which are inherently unsecured.

One concern associated with remote fingerprint sensors relates to the transmission of information used for verification. Whereas a fingerprint is unique and cannot be easily duplicated, such is not the case for the electronic representation of the fingerprint. Knowledgeable individuals with incentive to gain access to a system can record such an electronic representation for use at a later time. In addition, the signal providing access may be recorded for later use thus circumventing a security system.

PCMCIA, an organisation comprised of hundreds of manufacturers of memory cards and related peripheral equipment, has established standards for peripheral and memory cards. PCMCIA cards enhance the capabilities of a computer by providing a standard hardware interface and standard software protocols. PCMCIA cards have been designed with memory, fax machines, modems, and disk drives. The standard connector size makes them compatible with many portable computers and the PCMCIA standard allows for easy installation and removal of cards. One such PCMCIA card that is disclosed in U.S. Pat. No. 5,468,952 is a bar code scanning device. Such a device provides convenience in portability as well as use.

The PCMCIA has established spatial standards for circuit boards intended to be used in portable computers. PCMCIA has developed a 68 pin memory card standard for three memory card types.

Type I Memory Cards are the same width and length as a common credit card, about 54 mm×85.6 mm, but are thicker than a credit card. The thickness of a Type I card is 3.3 mm.

Type II Memory Cards are used by those companies which are utilizing memory components that are too high to be housed within a Type I card. Type II Memory Cards are also the same overall length and width as credit cards, but have a raised body cross section in the substrate area which gives them an overall thickness of 5 mm. The raised substrate areas of these cards are 48 mm in width.

Type III Memory Cards are the result of a recent movement sponsored by the Small Form Factor Committee to enable 1. 8"Small Form Factor Disk Drives to be plugged into memory card connectors. Type III Memory Cards are the same length and width as Type I Memory Cards; however, Type III Memory Cards have a substrate area thickness of 10.5 mm. Also, Type III Memory Cards require card guide opening width of 51 mm on the header connector to accommodate the slightly wider raised substrate area.

Another type of card that is now commonly available and well known in the art is a Smart Card. The Smart card comprises a microprocessor, non-volatile storage and random access memory (RAM) all on a small portable card. The use of Smart Cards is increasing because they present a convenient method for providing software and a processor for executing same within a compact and portable device. For example, a smart card credit card can maintain balance information and update a balance when used. Since information is stored on the card and security functions for protecting the information are also on the smart card, the resulting card is temper resistant and also portable alleviating a need to electronically transmit information to each device requiring access to the information. As such, smart cards are known to be advantageous for numerous applications Before the advent of computers and imaging devices, research was conducted into fingerprint characterisation and identification. Today, much of the research focus in biometrics has been directed toward improving the input transducer and the quality of the biometric input data. Fingerprint characterization is well known and can involve many aspects of fingerprint analysis. The analysis of fingerprints is discussed in the following references which are hereby incorporated by reference:

Xiao Qinghan and Bian Zhaoqi,: An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73–18, Purdue University, School of Electrical Engineering, 1973;

Wegstein, An Automated Fingerprint Identification System, NBS special publication, U.S. Department of Commerce/National Bureau of Standards, ISSN 0083–1883; no. 500–89, 1982; Moenssens, Andre A., Fingerprint Techniques, Chilton Book Co., 1971; and, Wegstein and J. F. Rafferty, The LX39 Latent Fingerprint Matcher, NBS special publication, U.S. Department of Commerce/National Bureau of Standards; no. 500–36, 1978.

Of course, other contact imagers such as palm print imagers are also known to exist.

Object of the Invention

Thus, in an attempt to overcome these and other limitations of known prior art devices, it is an object of this invention to provide a biometric input device including a peripheral card reader.

It is an object of the invention to provide a device that minimises the unsecured channels used in user verification and securing electronic files.

It is a further object of the invention to provide a biometric input device which allows for individual analysis of biometric information provided thereto.

SUMMARY OF THE INVENTION

In accordance with the invention there is provided, a biometric sensing device including a peripheral port for accepting a peripheral device.

In accordance with the invention there is provided a peripheral biometric sensing device for use with a computer and a peripheral card. The sensing device comprises:

a housing;

a biometric information input means disposed within the housing for capturing biometric data and providing a first signal in dependence thereon;

a peripheral card interface disposed within the housing for interfacing with the peripheral card and for receiving the first signal and providing same to the peripheral card; data transfer means for providing data in dependence upon the captured biometric data to the computer; and means for receiving a second signal from the peripheral card and providing the second signal to the data transfer means.

In accordance with the invention there is provided a device for use with a system. The device comprises:

a housing;

a transducer disposed within the housing for capturing biometric information and converting the biometric information into a first signal;

a peripheral card interface disposed within the housing for accepting a peripheral card;

means for providing the first signal to the peripheral card interface; and data transfer means for receiving the first signal and coupled with the peripheral card interface for receiving a second signal therefrom and for transmitting a signal dependent upon one of the first signal and the second signal from the device to the system.

In accordance with another aspect of the invention there is provided a method of identifying a user of a computer system provided with a peripheral device comprising a transducer, a peripheral card interface, and a data transfer means. The method comprises the steps of:

providing biometric information to the transducer;

detecting a presence of a peripheral card interfaced with the peripheral card interface;

if a peripheral card is detected, using the peripheral card, transforming the data into a first signal and providing the first signal to the data transfer means;

if a peripheral card is not detected, providing a different signal based on the data to the data transfer means;

transmitting the signal received by the data transfer means to the computer.

In accordance with the invention there is provided a device for use with a system. The device comprises:

a housing;

a transducer disposed within the housing for capturing biometric information and converting the biometric information into a first signal;

a peripheral card interface disposed within the housing for accepting a peripheral card;

means for providing the first signal to the peripheral card interface;

means for receiving a second other signal from the peripheral card interface;

means for detecting a peripheral card interfacing with the peripheral card interface and for providing an indication of a presence or an absence of the peripheral card;

data transfer means for receiving at least one of the first signal and a second other signal from the peripheral card interface and for transmitting a signal to the system in dependence upon the received signal and the indication.

In an embodiment, the data transfer means comprises means responsive to the indication for performing one of transmitting the first signal to the system in the absence of a detected peripheral card and transmitting a signal received from the peripheral card interface if a peripheral card is detected.

An advantage of the biometric sensing device according to the invention is it limits accessibility to secure information and to security processes; thereby, it improves overall security.

A biometric input device according to the invention reduces communication paths for biometric information and thereby reduces efficacy of a record-playback attack on system security.

BRIEF DESCRIPTION OF THE DRAWINGS

Exemplary embodiments of the invention will now be described in conjunction with the following drawings, in which.

DETAILED DESCRIPTION OF THE INVENTION

In this disclosure and the claims which follow, the term contact imager is defined as an imaging device for imaging objects in contact therewith such as an optical or capacitive fingerprint, palm, or skin imager.

Figure 1:
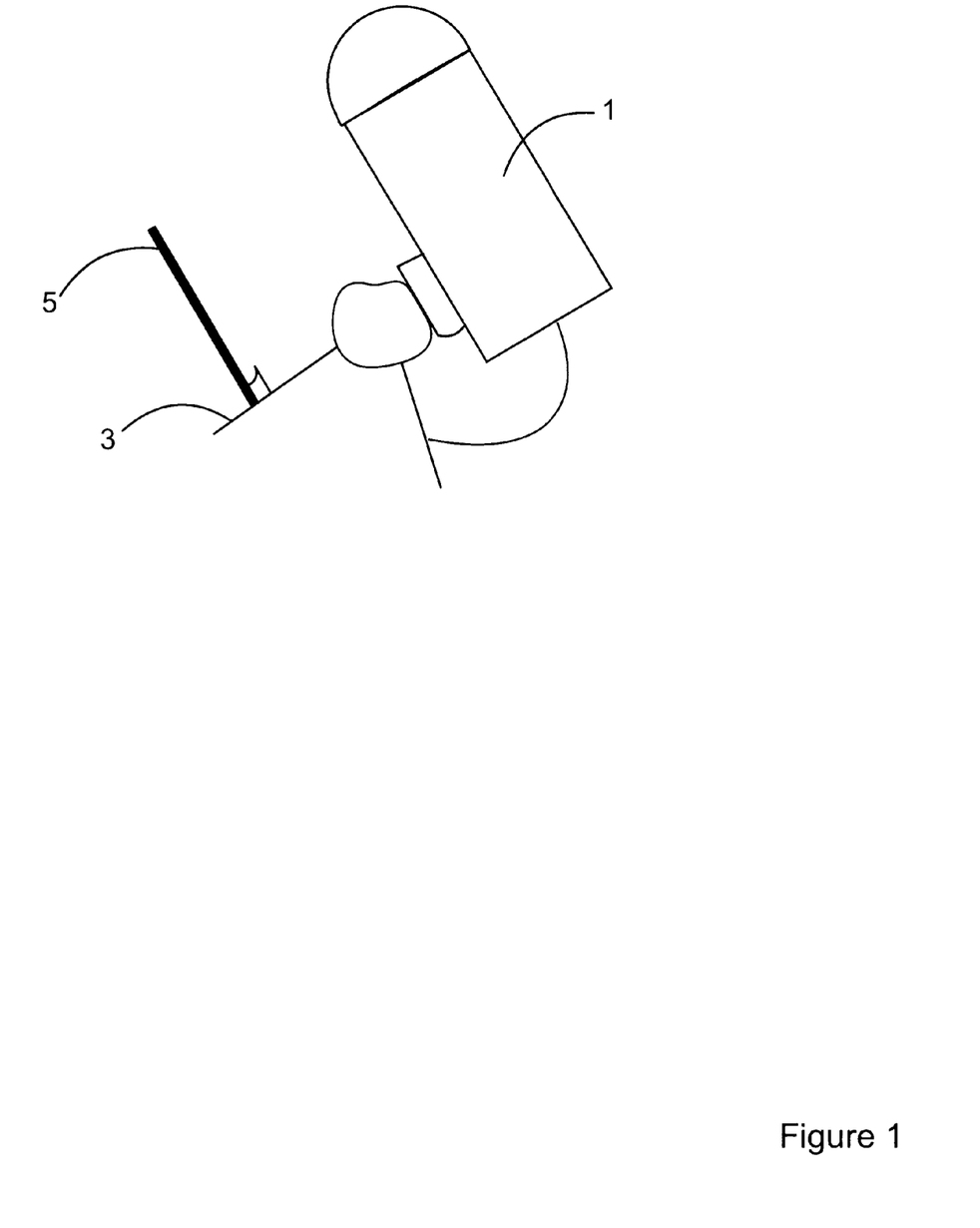
FIG. 1 is a simplified diagram of a biometric input device according to the invention comprising a microphone and a peripheral card slot.

Referring to FIG. 1 a biometric input device is shown comprising a microphone 1 and incorporating a peripheral slot 3 for accepting a smart card 5. In voice processing and voice recognition, it is known to filter voices in order to facilitate a recognition process. Such filtration is designed to limit a number of extraneous features such as background noise and other unnecessary information. Unfortunately, due to the nature of biometric information such as voice information, each individual has different biometric information comprising different extraneous information. According to the present invention, a method is provided for customising aspects of biometric processing in a secure fashion.

When a user wishes to be authorised using a voice recognition system, the user inserts a peripheral card in the form of a smart card 5 into the peripheral slot 3. Within the peripheral slot 3 is a peripheral card interface for interfacing with the smart card 5 and for providing information thereto and receiving information therefrom. The user then talks into the microphone. The voice is converted into electronic signals and processed within the smart card 5 according to smart card contents. For example, only particular frequencies are maintained in order to maintain significantly distinguishing biometric information while filtering a substantial amount of background noise. The use of a smart card 5 for this application allows use of a complex filtering function to be implemented in a microprocessor contained within the smart card 5. Such a filtering function is specific to a user. Alternatively, the filtering function is not user specific. Further alternatively, the entire voice recognition function is performed within the smart card 5. Preferably, the smart card 5 is of a tamper proof design and encryption is used to secure its contents.

Optionally, when a same filtering function is used for many users or a predetermined class of functions is applicable to a large number of users, a custom integrated circuit for performing at least one of the filtration and characterisation is incorporated into the smart card and user specific parameters are recorded therein. This permits implementation of an inexpensive and adaptable characterisation or filtration process within a biometric input device.

A very significant concern in security systems such as biometric identification systems is tampering. When a biometric input device is connected as a computer peripheral, tampering with the biometric characterisation or identification procedure as well as record-playback of biometric information are significant concerns. In an attempt to reduce the efficacy of tampering with a computer system, the device according to the invention allows for portability of some of the required information. In order to prevent signal interception and some forms of record-playback, the invention incorporates a peripheral card interface 3 into a biometric input device. Since a peripheral card with a microprocessor is portable, it becomes difficult to tamper with it and with a host computer. This is advantageous.

Another advantage to an implementation as described with reference to FIG. 1 is that a plurality of different filtration processes are possible for a given user. Optionally, the user has several smart cards, each of which is password protected or protected by an alternative form of biometric information. The filtration is therefore modifiable which is significantly advantageous as described herein below.

Figure 2:
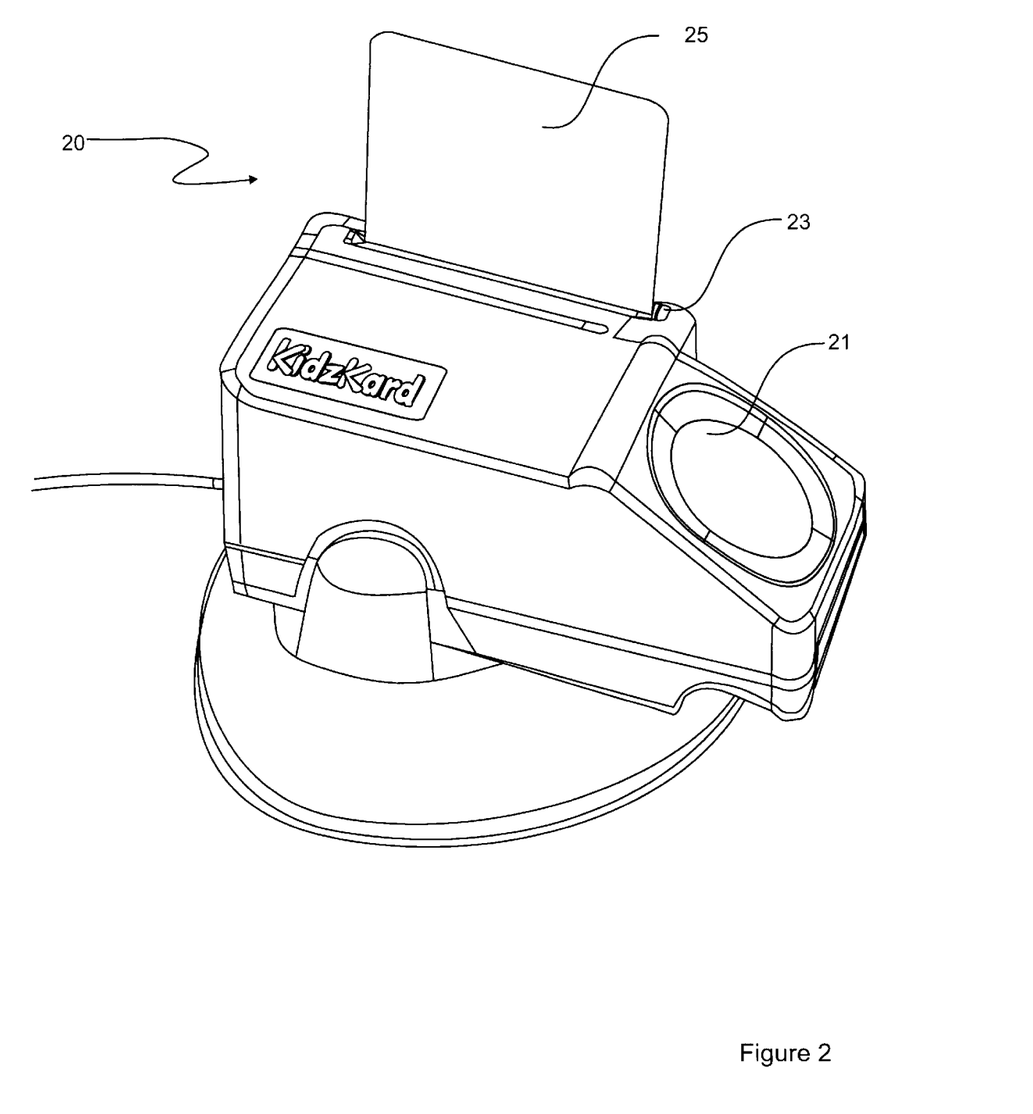
FIG. 2 is a simplified diagram of a biometric input device according to the invention comprising a contact imager and a peripheral card slot.

Referring to FIG. 2, a biometric input device 20 comprising of a contact imaging device 21 is shown. The contact imaging device 21 shown is a fingerprint scanner. The biometric input device is provided with a peripheral slot 23. The peripheral slot is for accepting a peripheral card in the form of a smart card 25. The smart card 25 is for performing functions relating to a captured fingerprint. Examples of functions implemented within the smart card are described hereinbelow.

Advantageously, a fingerprint provided to the fingerprint imaging device 20 is partially processed within the smart card 25 in order to increase security. The smart card is difficult to monitor when compared to a connection between a peripheral device and a computer and through encryption such as session key encryption, results of processing performed within the smart card are secured from monitoring. This prevents individuals from executing processes within a host system for determining user ID etc. Since biometric information is being put forth for security applications from military to financial to personal access, enhanced security as provided according to the invention is believed to be a welcome improvement.

Figure 3:
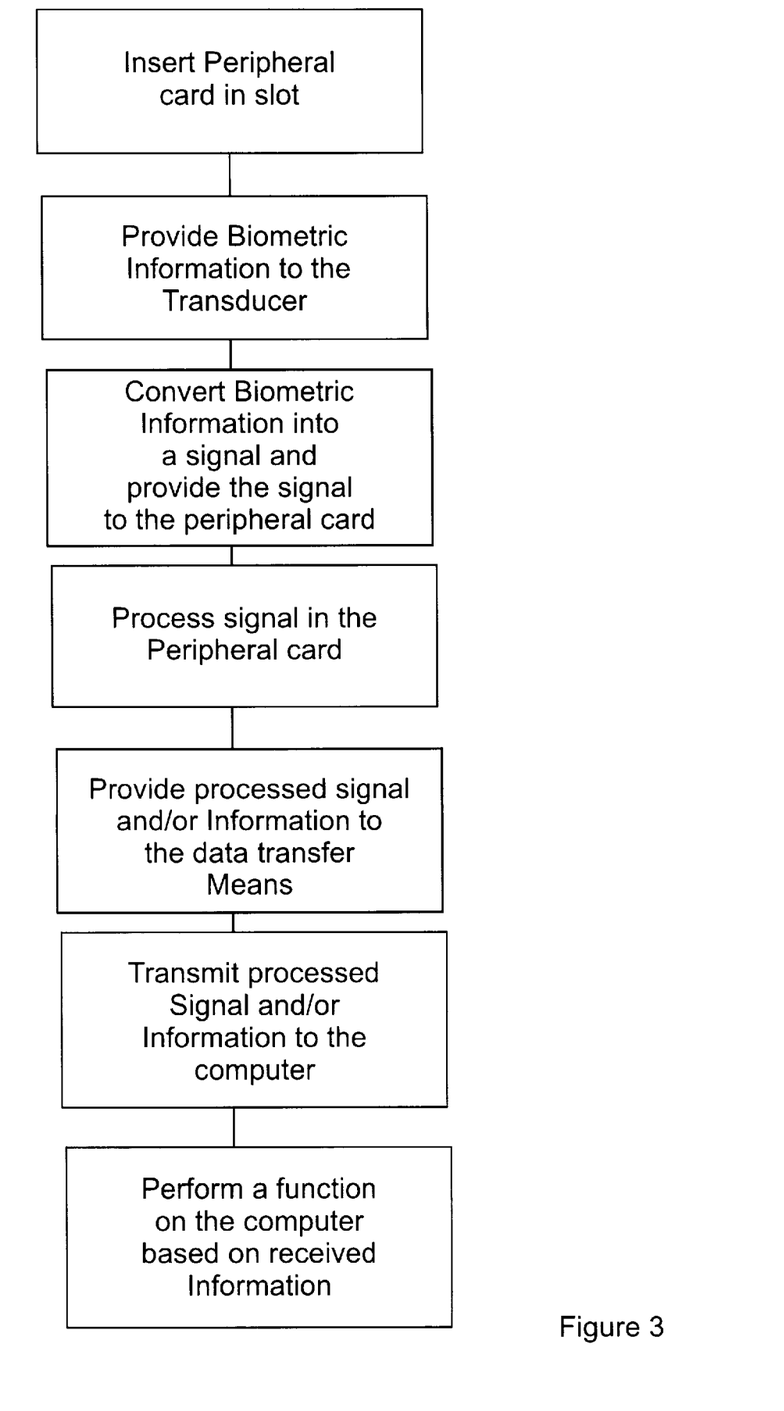
FIG. 3 is a simplified flow diagram of a method of using a device according to the invention.

Referring to FIG. 3, a simplified flow diagram of a method implemented of using a peripheral device with a computer and according to the invention is shown. A smart card is inserted into the peripheral card slot such that it mates with the peripheral card interface. Biometric information is provided to the transducer in the form of a biometric input device. The biometric information is converted into an electrical signal and provided to the smart card. The smart card processes the information and provides processed information to the peripheral device interface from which it is provided to a data transfer means and to the computer. The computer performs a function based on the processed information.

Examples of functions include, identifying a user, encrypting data, decrypting data, setting up user preferences, authorising user access, initiating a predetermined program, and so forth. Of course, functions are to some degree dependent upon the processed information. For example, when the processed information comprises filtered biometric information, further processing is performed by the computer to identify the biometric information or to derive information therefrom. When biometric information processing and user identification occurs within the smart card, then the computer need only verify an authorisation to determine a user identity. In an alternative embodiment, when user identification occurs within the smart card, a verification of the user identification is performed in the computer to enhance security. Of course, numerous other functions and smart card operations are possible with a device according to the invention.

Figure 4:
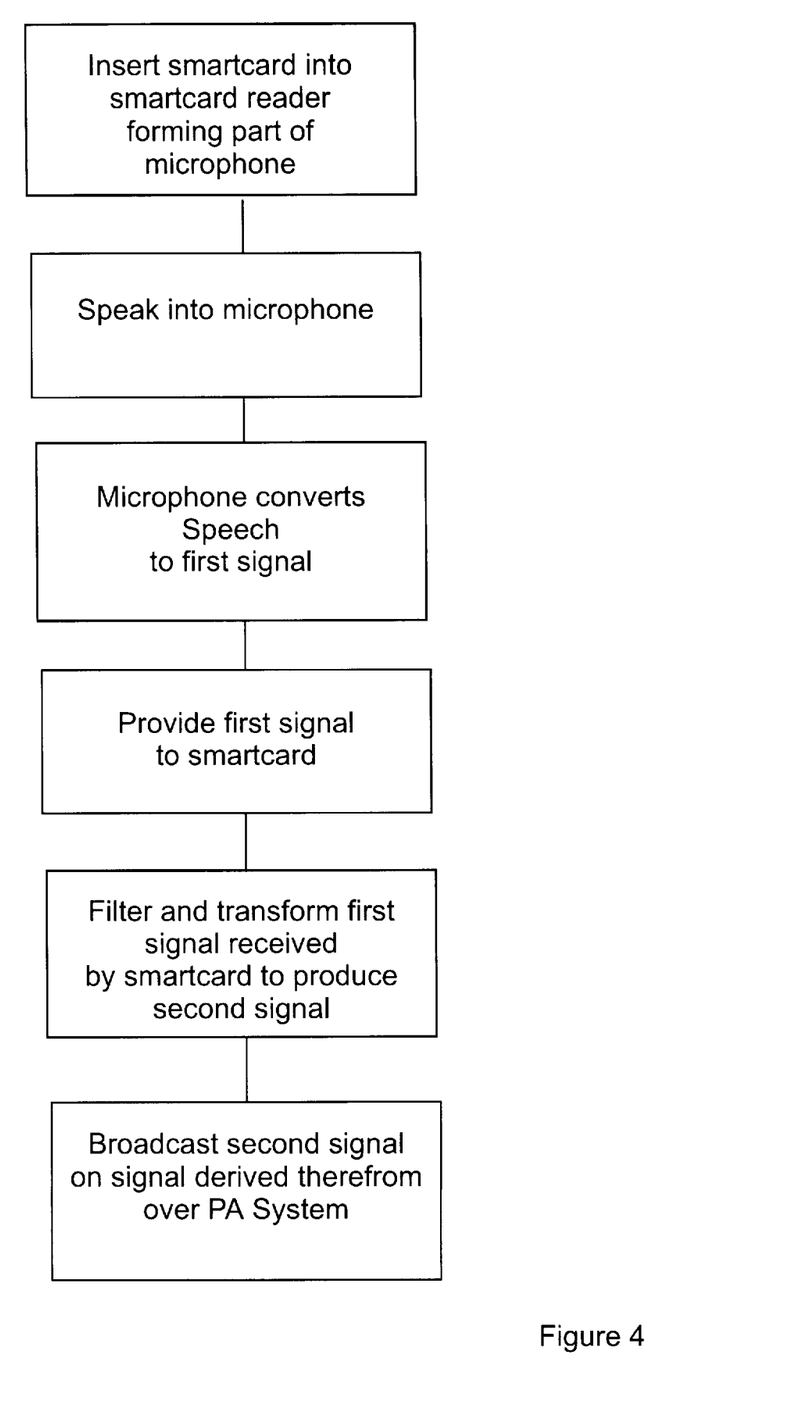
FIG. 4 is a simplified flow diagram of a method of using a device according to the invention for use in a public address (PA) system.

Referring to FIG. 4, a method of enhancing flexibility of a public address (PA) system is shown. Each user of the PA system is provided with a peripheral card in the form of a smart card. The smart card implements voice filtration and transformation. When a user wishes to address people through the PA system, the user inserts their smart card into a peripheral card reader contained within a biometric input device in the form of a microphone and speaks into the microphone. For example, at an airport, it is often difficult to understand announcements made using the PA system. The speech captured by the microphone is converted into a first signal and provided to the smart card.

The first signal is provided to the smart card where it is filtered and/or transformed to result in a second signal. This second signal or a signal derived therefrom is then broadcast on the PA system. According to the invention, a filter and transformation of a speaker's voice improves the audible quality of the resulting speech to improve comprehension. Of course, since each individual has their own smart card, the filtration and transformation can be optimised for that particular user. Further, the use of individual smart cards allows for less expensive and more flexible filtration and transformation because a very general analysis, filtration and transformation circuit is avoided.

Figure 5:
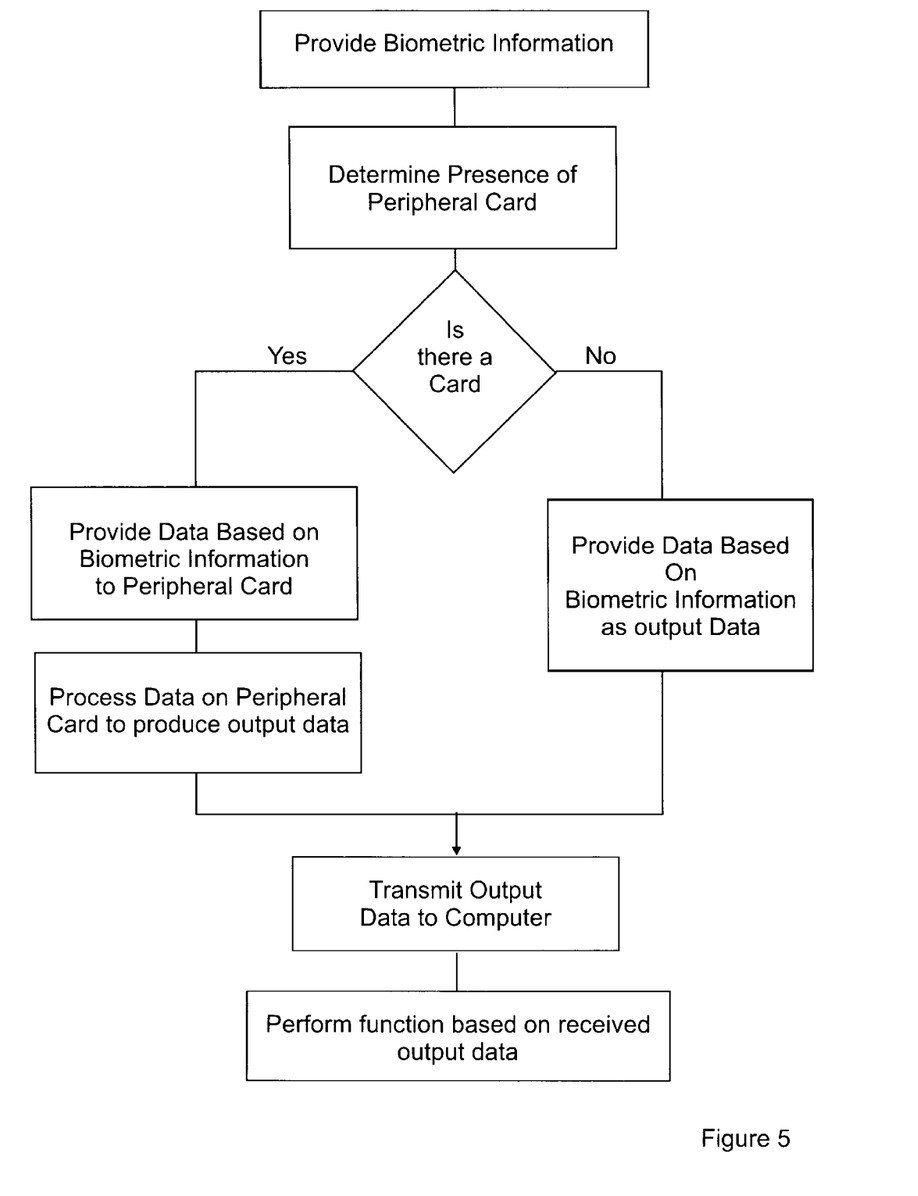
FIG. 5 is a simplified flow diagram of a method of using a device according to the invention in each of two modes based on a presence or absence of a peripheral card interfacing with the peripheral card slot.

Referring to FIG. 5, a simplified flow diagram of a method of enhancing operation of fingerprint identification system is shown. Biometric information is provided to a contact imager. The biometric input device verifies a presence of a peripheral card in the form of a smart card. When a smart card is present the biometric information is provided thereto. A processor on the smart card, processes the biometric information according to a predetermined algorithm. For example, a known characterisation process is employed to determine features within the biometric information. Examples of features for a fingerprint include longest lines, minutiae, centre of a fingerprint, and so forth. For a speech sample, examples of features include dominant frequency, and so forth. The algorithm is specific to the biometric information type—fingerprint, retinal scan, palm print, voice print, facial features, etc.—and to the user providing the smart card. Of course, when the smart card is stolen, the algorithm remains specific to the user from whom it was stolen; thereby enhancing security. The use of user specific algorithms for verification, enhances security while reducing a number of people who are not easily identified using biometric information. For example, when using fingerprint recognition, it is believed to be about 5% of the population—1 in 20 people are not identifiable because of finger tip damage, fingerprint type, and other known concerns. Reducing this number is significantly advantageous. Heretofore, efforts to reduce this number have often reduced overall security. According to the present invention, overall security is not reduced since user specific characterisation is employed.

In the absence of a smart card, the biometric information input device acts like a biometric information input device absent a peripheral card interface. The biometric information is provided to the computer for analysis. This enhances flexibility of the device and provides different security levels. For example, a computer system requiring biometric information for system access and enhanced security for modification of data and or programs within the computer is easily implemented. According to the invention, biometric information of each of a plurality of users are registered and the users are provided access upon presentation of their biometric information. For other users, a smart card is required provided enhanced security according to the invention. The enhanced security reduces likelihood of unauthorised data tampering and enhances flexibility of the security system. Also, those users who fall within the 5% of the population that is difficult to identify using fingerprint information are also provided with smart cards to ensure user specific characterisation and registration of their fingerprints.

Alternatively, a peripheral card slot comprising a peripheral card interface is located within a transducer housing in the form of a video camera, a telephone, a digital camera, or a recording device. The slot is for accepting a card in the form of a smart card. The smart card performs functions such as background filtering, signal boosting, etc. as desired. Advantageously, the functions performed within the smart card are user specific. This allows for efficient implementation of these functions in a fashion that is effective. Further, it limits usefulness of someone's smart card to another person and, thereby, decreases the value of a smart card to anyone else.

For example, when used with a video camera, a skin tone of a user is stored within a smart card. The camera then adjusts light levels and contrast to best approximate the desired skin tone of the individual. Such a system prevents backlight from causing faces to be very dark and enhances colour balance for faces which are commonly the most significant aspect of home videos. Alternatively, a smart card is provided during playback to transform the video signal according to requirements of a video recorder to which the recorded video is being transferred or a television upon which the recorded video is being displayed. This enhances overall image quality for an average user.

When used with a telephone, known line noise such as that caused by a cordless phone or by a wiring fault is filtered for the telephone user. Also, a person speaking into the telephone according to the invention is capable of being identified in dependence upon biometric information in the form of voice or, alternatively when the telephone is also equipped with a contact imaging device, in the form of a fingerprint. Such an identification has numerous applications.

Optionally, according to the invention, when no peripheral card is interfaced with a transducer device according to the invention and as shown in FIGS. 1 and 2, the device operates as a biometric information capture means providing the biometric information or other information derived therefrom to the computer. There are many methods of detecting a presence of a peripheral card. These include switches to detect a card's presence, testing for certain data at predetermined addresses, dedicated connections providing indications of card presence, and so forth. A skilled engineer, knowing of the advantages of automatically detecting a card's presence, is capable of designing a peripheral card detector for use in the present invention. Numerous other embodiments may be envisaged without departing from the spirit and scope of the invention.

What is claimed is:

1. A peripheral biometric sensing device for use with a computer and a peripheral card including a processor, the peripheral biometric sensing device comprising:
    a housing;
    a biometric information input means disposed within the housing for capturing biometric data and providing a first signal in, dependence thereon;
    a peripheral card interface disposed within the housing for interfacing with the peripheral card and for receiving the first signal and providing same to the peripheral card for use in user authorisation performed by the processor;
    means for detecting a presence of a peripheral card interfacing with the peripheral card interface and for providing an indication of the presence or absence of the peripheral card;
    data transfer means for providing data in dependence upon the captured biometric data to the computer, the data transfer means comprising means responsive to the indication for transmitting the first signal to the system in the absence of a detected peripheral card and for transmitting first signal to the peripheral card and a second signal received from the peripheral card to the syste if a peripheral card is detected as being present; and
    means for receiving a second signal from the peripheral card, the second signal being created by the processor of the peripheral card in dependence upon the first signal, and providing the second signal to the data transfer means.

2. A peripheral biometric sensing device as defined in claim 1 wherein the data transfer means is for providing at least one of the captured biometric data and data provided by the peripheral card in dependence upon the captured biometric data to the computer.

3. A peripheral biometric sensing device as defined in claim 1 wherein the biometric information input means comprises a contact imaging device disposed within the housing for capturing fingerprint data.

4. A peripheral biometric sensing device as defined in claim 1 wherein the peripheral card interface is a smart card interface disposed within the housing and for accepting a smart card.

5. A device for use with a system comprising:
    a housing;
    a transducer disposed within the housing for capturing biometric information and converting the biometric information into a first signal;
    a peripheral card interface disposed within the housing for accepting a peripheral card including a processor;
    means for detecting a presence of a peripheral card interfacing with the peripheral card interface and for providing an indication of the presence or absence of the peripheral card;
    means for providing the first signal to the peripheral card interface; and data transfer means for receiving the first signal and coupled with the peripheral card interface for receiving a second signal therefrom, the second signal being created by the processor of the peripheral card in dependence upon the first signal, and responsive to the indication for transmitting the first signal to the system in the absence of a detect peripheral card and for transmitting first signal to the peripheral card and a second signal received from the peripheral card to the system if a peripheral card is detected as being present.

6. A device as defined in claim 5 wherein the transducer is a microphone.

7. A device as defined in claim 6 wherein the peripheral card reader is a smart card reader for interfacing with a smart card.

8. A device as defined in claim 5 wherein the transducer is a contact imaging device, the system is a computer, and the device forms a computer peripheral device in communication with the computer.

9. A computer peripheral device as defined in claim 8 wherein the peripheral card reader is a smart card reader for interfacing with a smart card.

10. A method of identifying a user of a computer system provided with a peripheral device comprising a transducer, a peripheral card interface, and a data transfer means comprising the steps of:
    providing biometric information to the transducer;
    detecting a presence of a peripheral card interfaced with the peripheral card interface, the peripheral card including a processor;
    if a peripheral card is detected, using the processor of the peripheral card for transforming data indicative of the biometric information and provided from the computer system into a first signal and providing the first signal to the data transfer means;

if a peripheral card is not detected, providing a different signal based on the data to the data transfer means;

transmitting the signal received by the data transfer means to the computer.

11. A method of identifying a user of a computer system as defined in claim 10 wherein the step of transforming the data is performed by filtering the data.

12. A method of identifying a user of a computer system as defined in claim 10 wherein the step of transforming the data is performed by characterising the data.

13. A method of identifying a user of a computer system as defined in claim 10 wherein the step of transforming data indicative of the biometric information is performed by registering the data against data stored within the peripheral card from authorised users of the peripheral card and determining a first code.

14. A method of identifying a user of a computer system as defined in claim 13 comprising the steps of transmitting the data to the computer, registering the data against stored data from authorised users of the computer to determine a second code; comparing the first code determined with the peripheral card and the second code determined with the computer.

15. A method of identifying a user of a computer system as defined in claim 14 wherein the code is dependent on a user identification.

16. A method of identifying a user of a computer system as defined in claim 13 wherein the code is one of an encryption key and a decryption key.

17. A device for use with a system comprising:

a housing;

a transducer disposed within the housing for capturing biometric information and converting the biometric information into a first signal;

a peripheral card interface disposed within the housing for accepting a peripheral card, the peripheral card including a processor;

means for providing the first signal to the processor of the peripheral card;

means for receiving a second other signal from the peripheral card interface, the second other signal being formed in dependence upon processing of the first signal by the processor of the peripheral card;

means for detecting a peripheral card interfacing with the peripheral card interface and for providing an indication of a presence or an absence of the peripheral card;

a transceiver for receiving at least one of the first signal and the second other signal from the peripheral card interface responsive to the indication for transmitting the first signal to the system in the absence of a detected peripheral card and for transmitting first signal to the peripheral card and a second signal received from the peripheral card to the system if a peripheral card is detected as being present.

18. A device for use with a system as defined in claim 17 wherein transceiver comprises means responsive to the indication for transmitting the first signal to the system in the absence of a detected peripheral card and transmitting a signal received from the peripheral card interface if a peripheral card is detected, the signal being formed in dependence upon processing of the first signal by the processor of the peripheral card.

* * * * *

UNITED STATES PATENT AND TRADEMARK OFFICE
CERTIFICATE OF CORRECTION

PATENT NO. : 5,987,155
DATED : Nov. 16, 1999
INVENTOR(S) : Dunn, Borza, Freedman It is certified that error appears in the above-identified patent and that said Letters Patent is hereby corrected as shown below:

At column 9 line 52 please replace "in," with --in--

At column 10 line 2 please replace "syste" with --system--

Signed and Sealed this

Ninth Day of May, 2000

Attest:

Q. TODD DICKINSON

*Attesting Officer*  *Director of Patents and Trademarks*